US006758133B2

(12) United States Patent
Weber

(10) Patent No.: US 6,758,133 B2
(45) Date of Patent: Jul. 6, 2004

(54) DEVICE FOR SLICING FOODSTUFF

(75) Inventor: Günther Weber, Neubrandenburg (DE)

(73) Assignee: Weber Maschinenbau GmbH & Co. KG, Breidenbach (DE)

( * ) Notice: Subject to any disclaimer, the term of this patent is extended or adjusted under 35 U.S.C. 154(b) by 0 days.

(21) Appl. No.: 10/296,744

(22) PCT Filed: Apr. 10, 2001

(86) PCT No.: PCT/EP01/04120

§ 371 (c)(1), (2), (4) Date: Jan. 15, 2003

(87) PCT Pub. No.: WO01/91980

PCT Pub. Date: Dec. 6, 2001

(65) Prior Publication Data

US 2004/0011224 A1 Jan. 22, 2004

(30) Foreign Application Priority Data

May 30, 2000 (DE) ........................................ 100 26 708

(51) Int. Cl.[7] ............................ A23L 1/00; A23N 7/00; A47J 17/00; B26D 1/16; B02C 18/00

(52) U.S. Cl. ............................ 99/538; 99/537; 99/584; 99/595; 83/248; 83/401; 83/473

(58) Field of Search ................... 99/537–545, 584–593, 99/595, 596, 567; 83/401, 248, 473, 496, 564, 698.61, 699.61, 491, 490, 530, 451, 48 B, 588, 471.3, 455, 477.2, 227; 33/628

(56) References Cited

U.S. PATENT DOCUMENTS

| | | | | | |
|---|---|---|---|---|---|
| 3,315,368 | A | * | 4/1967 | Duby | 33/628 |
| 4,538,356 | A | * | 9/1985 | Knepshield et al. | 33/628 |
| 4,704,959 | A | * | 11/1987 | Scallen | 99/538 |
| 5,241,887 | A | * | 9/1993 | Wolff et al. | 83/401 |
| 5,251,543 | A | * | 10/1993 | Brothers | 99/538 |
| 5,308,002 | A | * | 5/1994 | Pereira | 241/92 |
| 5,499,578 | A | * | 3/1996 | Payne | 99/537 |
| 6,200,621 | B1 | * | 3/2001 | Kojs | 426/518 |
| 6,269,740 | B2 | * | 8/2001 | Kojs | 99/537 |
| 6,293,482 | B1 | * | 9/2001 | Yoshida et al. | 241/238 |
| 6,484,627 | B1 | * | 11/2002 | Peter | 99/538 |

FOREIGN PATENT DOCUMENTS

| | | | |
|---|---|---|---|
| DE | 15 61 735 | * | 9/1993 |
| DE | 35 44 044 | * | 8/1996 |
| EP | 0 412 295 | * | 2/1991 |

* cited by examiner

*Primary Examiner*—Timothy F. Simone
(74) *Attorney, Agent, or Firm*—Gifford, Krass, Groh, Sprinkle, Anderson & Citkowski, PC

(57) ABSTRACT

An apparatus for slicing food products having a cutting knife which is driven in a rotary manner. The cutting plane of the knife extends perpendicular to the product support surface of a product supply device.

7 Claims, 1 Drawing Sheet

DEVICE FOR SLICING FOODSTUFF

BACKGROUND OF THE INVENTION

I. Field of the Invention

The invention relates to an apparatus for the slicing of food products such as ham, sausage, cheese and the like comprising a cutting knife which is driven in a rotating manner and/or which circulates in a planetary manner and whose cutting plane extends perpendicular to a product support surface of a product supply device, with the end of the product support surface at the cutting knife side being formed by a cutting edge part which forms a cutting gap together with the cutting knife.

II. Description of Related Art

Clean and flawless cuts are demanded from such apparatuses, which are usually called slicers and which work at very high cutting speeds. Even at these very high operating speeds and in particular also with products which are more difficult to cut up, such clean cuts are difficult to achieve.

In particular the quality and/or the accuracy of the cutting gap formed between the support surface for the respectively supplied product and the cutting knife, which both rotate about their own axis and circulate in a planetary manner, have an influence on the cutting quality.

In practice, the quality and/or accuracy of the cutting gap is impaired above all by depth differences of the cutting knife which are caused by production and which can easily result in deviations arising with respect to the desired cutting gap size, with the desired cutting gap size being zero in the ideal case.

SUMMARY OF THE INVENTION

It is the object of the present invention to design an apparatus of the kind initially named in a manner such that differences from the desired cutting gap impairing the cutting quality can be eliminated and thus an optimum and constant cutting gap can be ensured independently of the respectively used knife and also independently of the respective operating conditions.

In accordance with the invention, this object is satisfied in that the cutting edge part is displaceably supported perpendicular to the cutting plane and is resiliently biased toward an abutment and in that the abutment is positioned and the cutting edge part is designed such that the cutting edge part is at least touched by the knife in each knife passage opposite to the bias applied and is in particular deflected slightly against (or opposite to) the bias.

The cutting edge part, which forms the cutting gap together with the cutting knife, is displaced by a minimal amount from its base position due to this design, with the size of this displacement lying in the range of a few tenths of a millimeter.

To ensure a cooperation free of problems between the cutting knife and the cutting edge part in this connection, the cutting edge part is designed in the entry region of the cutting knife with at least one guide surface which ensures that the cutting knife comes into contact with a slightly inclined surface section of the cutting edge part, whereby interfering friction and unwanted wear are practically eliminated.

BRIEF DESCRIPTION OF THE DRAWING

Further advantageous embodiments and features of the invention are recited in the dependent claims and will also be explained in the description of an embodiment with reference to the drawing. There are shown in the drawing:

DETAILED DESCRIPTION OF THE INVENTION

Figure 2:
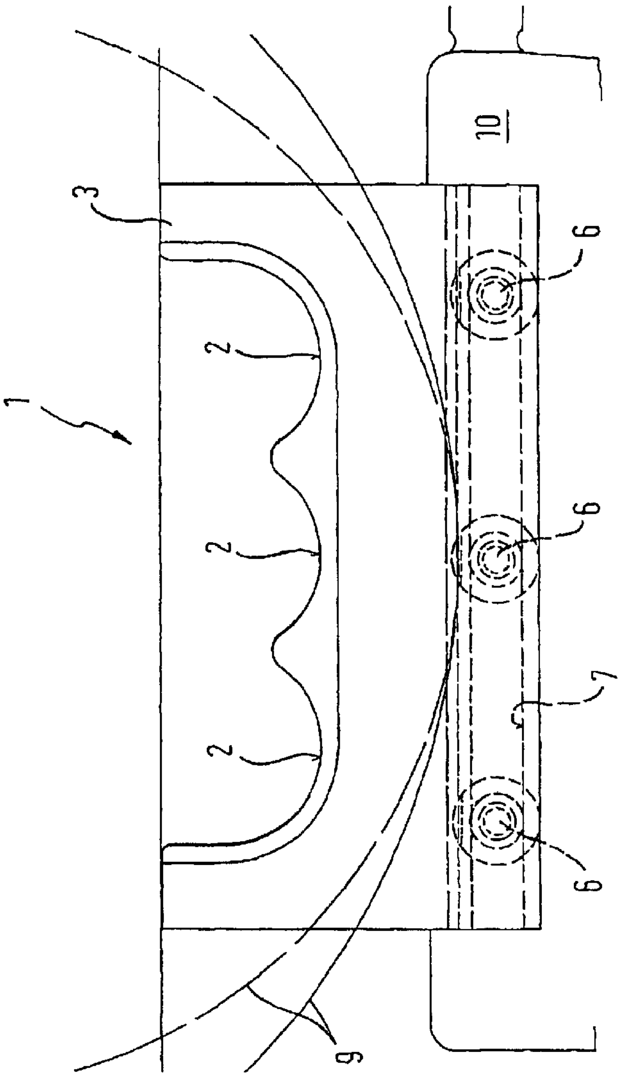
FIG. 2 a front view of the arrangement in accordance with FIG. 1.

The product supply unit 1 arranged in a machine housing 10 includes a product support surface 2 along which the product to be sliced in each case is transported in the direction of the cutting gap formed between the knife 4 and the front end of the product support surface 2. In the embodiment shown, the product support surface 2 has three receivers arranged lying next to one another for three products to be cut simultaneously, as is shown in FIG. 2.

Figure 1:
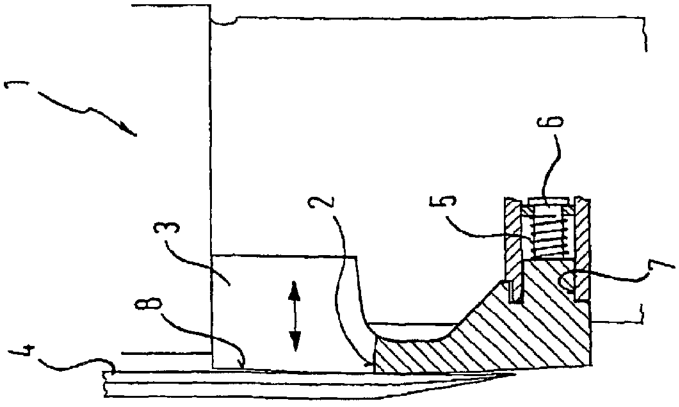
FIG. 1 in a schematic manner, a product supply unit cooperating with a cutting knife in a partly sectioned side view.

The front end of the product support surface 2 is, as is shown in FIG. 1, formed by a cutting edge part 3, which preferably consists of a suitable plastic material.

The cutting edge part 3 is displaceably supported in the product supply device 1 perpendicular to the cutting plane or to the circulating orbit of the cutting knife 4, for which purpose the product supply device 1 has suitable guide surfaces 7. Two orbits 9 of different cutting knives 4 are shown, for example, in FIG. 2.

The displaceability of the cutting edge part 3 in the direction of the cutting plane is bounded by an abutment 6 which ensures that the cutting edge part 3 can protrude into the cutting orbit of the knife 4 by a maximum of only a few tenths of a millimeter. The cutting edge part 3 is biased in the direction of the cutting plane by at least one spring element 5.

To ensure that the cutting edge part 3 can be displaced slightly against the spring bias with each cut, i.e. with each cooperation with the cutting knife 4, the cutting edge part 3 is fitted with a slightly inclined guide surface 8 in the region of the knife entry. In practice, a slightly inclined, short guide surface 8 is sufficient whose uppermost point is set back with respect to the front surface of the cutting edge part by, for example, approximately 1 mm and which subsequently merges into a vertical extent.

The light chamfering of a region of the front surface of the cutting edge part 2 required to provide the mentioned guide surface does not result in an impairment of the cutting quality, but it does allow a secure operation of the total apparatus while simultaneously ensuring an absolutely constant cutting gap, since the cutting gap is formed with each cut by the cooperation of the cutting knife with the cutting edge part displaceably supported perpendicular to the cutting knife plane and is practically kept to the value zero.

Instead of the above-described passive function of the cutting edge part 3, which is moved against a resilient bias perpendicular to the cutting plane by the cutting knife, in accordance with a further embodiment of the invention, an actively controlled cutting edge part can also be provided. The control of such a cutting edge part takes place in dependence on the movement of the knife and, optionally, also in dependence on knife characteristics. Piezo-electric elements or other actuating members, which ensure sufficiently fast and brief movements of the cutting edge part over short paths, for example, in the millimeter range, can, for example, be considered as actuators for the movement of the cutting edge part

What is claimed is:

1. An apparatus for the slicing of food products comprising a cutting knife (4) which is driven in a rotating manner and/or circulates in a planetary manner and whose cutting plane extends perpendicular to a product support surface (2) of a product supply device (1), with the end of the product support surface (2) at the cutting knife side being formed by a cutting edge part (3) which forms a cutting gap together with the cutting knife (4), characterized in that the cutting edge part (3) is displaceably supported perpendicular to the cutting plane and is biased against an abutment (6); and in that the abutment (6) is positioned and the cutting edge part (3) is designed such that the cutting edge part (3) is at least contacted by the knife (4) in each knife passage against the applied bias and is in particular slightly deflected against the bias.

2. An apparatus in accordance with claim 1, characterized in that the deflection of the cutting edge part (3) occurring with each knife passage amounts to a fraction of a millimeter.

3. An apparatus in accordance with claim 1, characterized in that the cutting edge part (3) is set under bias by means of at least one resilient element, made in block form for example, or of a spring element (5).

4. An apparatus in accordance with claim 1, characterized in that the cutting edge part has at least one guide surface (8) cooperating with the cutting knife (4).

5. An apparatus in accordance with claim 1, characterized in that the cutting edge part (3) preferably consists of a plastic material or of steel.

6. An apparatus in accordance with claim 1, characterized in that the cutting edge part (3) has a total path of displacement in the range of approximately 2 to 3 mm on its guide (7).

7. An apparatus for the slicing of food products comprising a cutting knife (4) which is driven in a rotating manner and/or circulates in a planetary manner and whose cutting plane extends perpendicular to a product support surface (2) of a product supply device (1), with the end of the product support surface (2) at the cutting knife side being formed by a cutting edge part (3) which forms a cutting gap together with the cutting knife (4), characterized in that the cutting edge part (3) is displaceably supported perpendicular to the cutting plane and is connected to an active actuating device which is controlled in dependence on the movement and/or on dimensional characteristics of the knife such that, with each knife passage, the knife and the cutting edge part form a cutting gap which can be pre-set in size and in particular has the value of zero.

* * * * *